(12) United States Patent
Bennett

(10) Patent No.: US 7,090,137 B1
(45) Date of Patent: Aug. 15, 2006

(54) DATA COLLECTION DEVICE HAVING VISUAL DISPLAY OF FEEDBACK INDICATORS AND MESSAGES

(75) Inventor: James D. Bennett, Austin, TX (US)

(73) Assignee: Intermec IP CORP, Everett, WA (US)

( * ) Notice: Subject to any disclaimer, the term of this patent is extended or adjusted under 35 U.S.C. 154(b) by 377 days.

(21) Appl. No.: 09/689,339

(22) Filed: Oct. 12, 2000

Related U.S. Application Data

(63) Continuation-in-part of application No. 09/025,161, filed on Feb. 18, 1998, now abandoned, which is a continuation-in-part of application No. 08/761,408, filed on Dec. 6, 1996, now Pat. No. 5,878,395.

(60) Provisional application No. 60/008,425, filed on Dec. 8, 1995.

(51) Int. Cl.
*G06K 7/10* (2006.01)
(52) U.S. Cl. .......................... 235/472.01; 235/462.45; 235/462.46; 235/472.02; 235/467.03
(58) Field of Classification Search ........... 235/472.01, 235/472.02, 472.03, 462.45, 462.46
See application file for complete search history.

(56) References Cited

U.S. PATENT DOCUMENTS 5,898,162 A * 4/1999 Koenck et al. ........ 235/472.01
6,641,046 B1 * 11/2003 Durbin .................. 235/472.01

* cited by examiner

*Primary Examiner*—Karl D. Frech
(74) *Attorney, Agent, or Firm*—Michael E. Williams; Simmons, Perrine, Albright & Ellwood

(57) ABSTRACT

A hand-held data terminal employs a projection display, thus eliminating the need for a flat screen display conventionally employed in hand-held data terminals. The projection display according to the present invention comprises a light source, a spatial light modulator for varying the light emitted by the light source to produce an optical image that corresponds to visual output of the data terminal, and a lens to project the resulting image. In this manner, the computer output that would normally be visualized using a display such as an LCD display may be viewed as a projected image on a nearby surface, thus allowing the data terminal to be made smaller while providing a robust visual user interface.

20 Claims, 13 Drawing Sheets

DATA COLLECTION DEVICE HAVING VISUAL DISPLAY OF FEEDBACK INDICATORS AND MESSAGES

CROSS-REFERENCE TO RELATED APPLICATIONS

The present application is a continuation-in-part of U.S. application Ser. No. 09/025,161, filed Feb. 18, 1998 (now abandoned); which is a continuation-in-part of U.S. application Ser. No. 08/761,408, filed Dec. 6, 1996 (now U.S. Pat. No. 5,878,395, issued Mar. 2, 1999); which in turn claims priority under 35 U.S.C. § 119(e) of U.S. Provisional Application No. 60/008,425 filed Dec. 8, 1995. U.S. Pat. No. 5,878,395, issued Mar. 2, 1999, and Provisional Application No. 60/008,425 are hereby incorporated herein by reference in their entirety.

BACKGROUND

1. Technical Field

The present invention relates generally to data collection devices; and, more specifically, to a portable code reader which in addition to, or instead of, traditional display means, incorporates an improved visual feedback system for interfacing with an operator.

2. Related Art

Prior hand-held portable data collection devices come in different shapes, sizes and weights. Typically, the smaller they are and the less they weigh, the more portable they are considered to be. Some hand-held portable data collection devices employ a laser for scanning coded images, while others employ a charge coupled device (CCD) based system with full illumination. Some of these devices are used to scan only one-dimensional (1D) coded images, while others can be employed to scan both 1D and two-dimensional (2D) coded and non-coded images.

Often the cost and size of a hand-held portable data collection device is determined by the number of features and the number of components implemented by the device. For example, a low cost barcode reader might include an optics assembly for illuminating and capturing an image of a barcode, processing circuitry for decoding the captured image, a buzzer or beeper and LEDs (Light Emitting Diodes) to signal successful or unsuccessful scanning events, a computing component for computations, and a memory for the storage of collected information. Although small in size, such data collection devices have several problems associated with their operation. They cannot convey more detailed information, such as the decoded information to an operator. Again, information regarding the unit itself, such as problems with the unit and the battery power levels cannot be easily conveyed to the operator. Although the LEDs may be used to convey some information to the operator, unless the operator is looking at the LED's any information conveyed via the LEDs is likely to be missed by the operator. Moreover, an operator who is color blind is likely to miss the information being conveyed via the LEDs. If an operator tries to look at the LEDs while trying to capture a target coded image using the hand-held data collection device, the operator is likely to miss the target by moving his eyes away from the target. If a buzzer is employed to convey information to an operator, the noise made by the buzzer is often not heard by an operator.

High-cost hand-held portable data collection devices include extra features such as a display for displaying collected information and a small keyboard for data entry. These devices typically have a display mechanism attached to the top of the device to enable the operator to read information that is collected. For example, an LCD screen is often located on the top of bar code scanners that provides information to a user. One problem with the higher-cost data collection devices is their bigger size and weight due to the addition of a display and a keyboard, which makes them less portable than a smaller and lower cost one. Another problem is the higher power consumption due to these additional components. A further problem with such systems is that the user may not read the information displayed on the display mechanism while simultaneously aiming the device at a coded image. The placement of the display mechanism, on top of the device and facing the operator during the operation of the device, does not take into account the fact that the operator is typically looking at the target coded image and cannot simultaneously focus his eyes on the display. Thus, any information displayed during the operation of the device that can facilitate in the activity of reading coded images may be lost on the operator. If the operator tries to focus his eyes on the display to read the displayed information, the operator is likely to aim the data collection device away from the target coded image in doing so. Other problems described above with reference to low cost data collection devices are also likely to be experienced with these higher-cost devices. Moreover, the power consumption of these higher-cost devices is likely to be a lot more than the lower-cost devices described above due to the addition of the display and a keyboard.

Another common problem faced by operators of hand-held data collection devices in large industrial environments is one of receiving messages from others in the work environment while operating a hand-held portable data collection device. Some of these operators carry a pager to receive messages or stay in touch with others. Others carry an RF communication device or a mobile telephone for communication with others. In such environments, the operators are not only required to carry a hand-held data collection device on their person but also on such associated communication devices. It is usually quite cumbersome to carry multiple devices all day long in work environments such as a warehouse, especially if the multiple devices are bulky.

Another problem typically faced by operators of hand-held data collection devices in noisy industrial environments is one of receiving audio messages announced over an audio system. Most messages announced over audio systems in noisy work environments are not heard by the intended recipients. Having a message communicated on their cellular phone or RF device, if an operator carries them around, is an option. However, a phone in noisy industrial environments is undesirable and costly, besides requiring the operator to carry an addition device.

Similarly, when an operator carries a pager for receiving paging messages, the operator will have to carry an additional device just to alert him of messages received or on the need to contact another individual. If the pager employs audio stimulus to alert an operator of incoming calls or messages, such audio stimulus may be drowned by the ambient noise in noisy work environments.

Conventional code reading units also suffer from other problems related to the reading of coded images. For example, while trying to collect data from coded images, such as bar codes using a hand-held data collection device, an operator may be too close or too far from the coded image for the device to properly read and decipher the coded image. The operator receives no indication of such orientation problems. Thus, the operator repeatedly attempts the read operation without much success wasting portable battery power. Similar problems occur when the hand-held data collection device is in an off-center of skewed orientation. The operator is not aware of the problem and may repeat the reading process many times before completing a successful read.

SUMMARY OF THE INVENTION

In accordance with the present invention, during the operation of a data collection device, such as a hand-held bar code reader, visual feedback information is provided to the system operator indicating that the data collection device is too far, too close, to the left of, or to the right of the target coded image, without distracting the operator or hampering the data collection activity. The visual feedback indicator can be textual or non-textual, and can be positional or non-positional, and may be both one-dimensional and two-dimensional. Information not related to the scanning activity, such as messages received from external systems, such as paging systems, or other system generated messaging information is also visually displayed.

A data collection device is used with a target surface, where the data collection device includes: a light source that emits a beam of light, control circuitry operable in a first mode and a second mode, and an image disposed on the target source. The control circuitry assists the light source in capturing the image at the target surface in the first mode, and assists the light source in displaying at the target surface in the second mode information related to, or unrelated to, the image captured at the target surface in the first mode.

The data collection device incorporates novel and efficient scanning features while displaying the feedback information or messages. The visual feedback indicators are displayed by tracing a laser beam in specific beam patterns. The pre-calculated beam patterns for standard feedback indicators are stored in memory. For efficiency in scanning and to save on power consumption, only the required number of lines, pre-calculated for standard feedback indicators, are scanned with the laser beam. Several different kinds of information are visually displayed. Both graphical and textual messages received over a wireless link during a scanning activity are displayed optically. System generated messages containing status information are also displayed.

In another embodiment, feedback indicators are visually displayed in conjunction with displays on a conventional display device such as an LCD screen.

Moreover, other aspects of the present invention will become apparent with further reference to the drawings, specification and claims which follow.

DETAILED DESCRIPTION

Figure 1A:
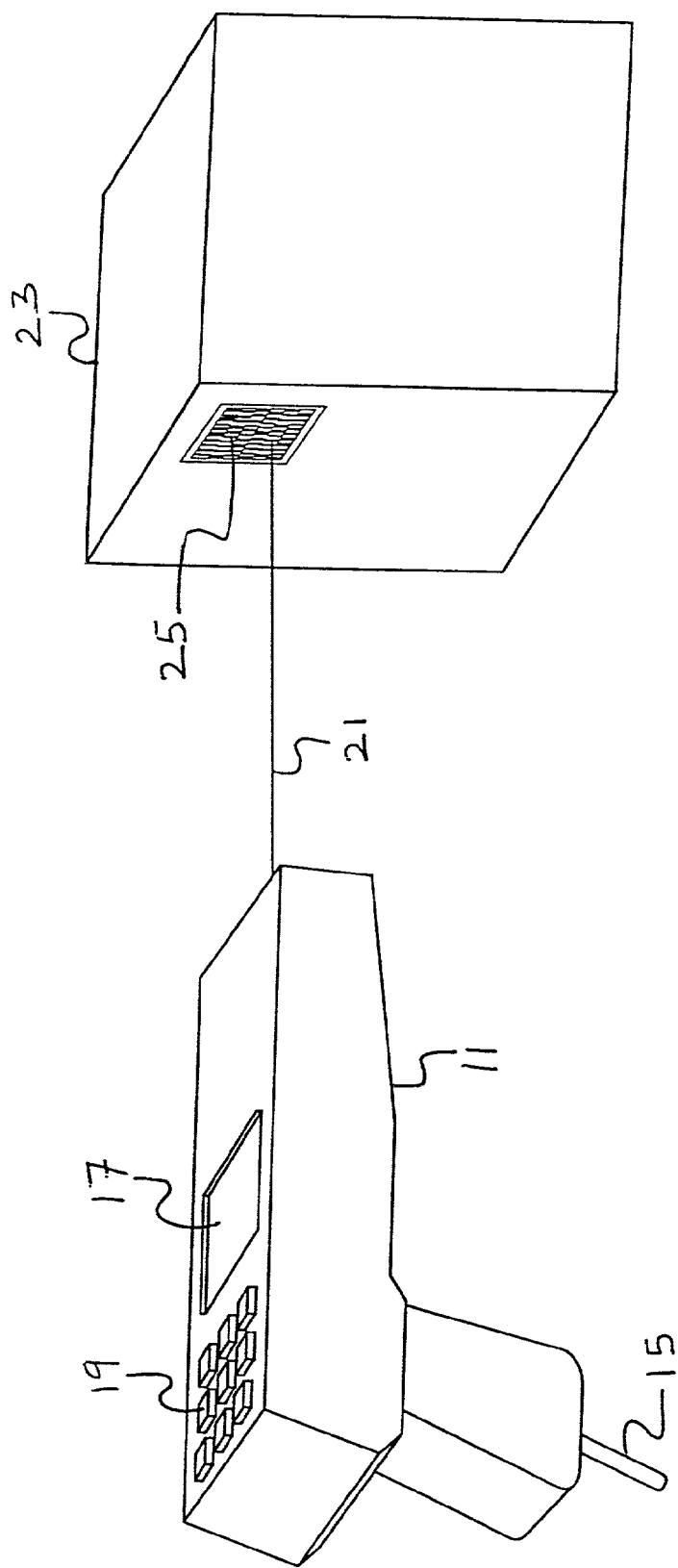
FIG. 1a is a perspective diagram of a hand-held portable data collection device in accordance with the present invention, showing a two dimensional (2D) coded image being scanned.

FIG. 1a is a perspective diagram of a hand-held portable data collection device 11, built in accordance with the present invention, showing a two dimensional (2D) coded image 25 being scanned. The hand-held portable data collection device 11 employs laser raster scanning to read 2D coded images. An operator (not shown) attempts to read coded images using the data collection device 11 by pointing it towards the coded target disposed on a target unit 23, such as the coded image 25 on a box, and activating scanning operations. The operator using the hand-held portable data collection device 11 is provided with feedback information, if necessary, by the data collection device 11 using visual feedback indicators that facilitates the coded image 25 scanning operation. Such feedback indicators are displayed on the target, unit such as a box, on which the coded image 25 is disposed. In addition, messages unrelated to the scanning activity, such as messages received from external systems or status messages generated by the hand-held portable data collection device 11, are also selectively displayed on the target unit or on a wall. To display such messages, the data collection device 11 employs the same circuitry used to scan coded images.

In particular, after attempting to aim the data collection device at the target 23, the operator initiates a reading attempt using the data collection device 11 in the same manner as can be found with conventional collection devices. For example, the collection device 11 may utilize a proximity detector, a gun-like trigger, or the keyboard to initiate a scanning attempt.

Aiming the data collection device 11 comprises attempting to: 1) center the scanning output on the target 23; 2) avoid skew between the device 11 and the target 23; and 3) move the device 11 into reading range of the target 23. Feedback indicators are provided by the device 11 on the target 23, as and when necessary, to facilitate operator activities during the three steps enumerated above.

If a successful scanning event occurs, the device 11 provides a successful completion feedback indicator. In general, the device 11 provides a feedback in the form of feedback indicators, messages displayed on a display unit, and/or mechanical stimulus to the operator, informing the operator of problems with scanning the coded image 25 or deciphering it.

In one embodiment, the hand-held data collection device 11 has an optional display device 17 on the top, which may be a liquid crystal display (LCD) based display device. The location of this display device is influenced by the need to provide easy display during operation. A keypad 19 is optionally provided for data entry by the operator. The hand held data collection device 11 also includes an RF transceiver with an antenna 15. One of the buttons of the keypad 19 acts as a trigger mechanism to activate the scanning of a coded image. Optionally, a finger operated trigger mechanism, not shown in the diagram, may also be used for initiating the scanning of a coded image.

In general, the information that must be conveyed to the operator by the device 11 may or may not be related to the data collection operation. However, since the information provided to the operator must be easy to read during the normal operation of the data collection terminal, the device 11 provides such information using feedback indicators or messages displayed on the target unit 23. The display of feedback indicators and messages on the target 23 is often accompanied by similar displays on the display unit 17, which the operator may choose to view either during a scanning activity or later. In addition, the feedback indicators or messages are provided employing the components that are also employed for the scanning of coded images by the data collection terminal.

The data collection device 11 is also capable of receiving messages from an external source over an RF transceiver (not shown) included in the data collection device 11. Such messages are selectively displayed using the display unit 17. On the receipt of a message from an external source, the data collection device 11 alerts an operator by a visual display of the received message or by an indication suggesting the receipt of a message. Since displaying a message on the hand-held data collection device 11, without prompting the operator to access it, is of limited use, the device 11 provides a visual indicator to prompt the operator to view the message. This ensures that the operator receives a prompt to read the messages.

In one exemplary embodiment of the present invention, various symbols are used as feedback indicators to convey information to an operator. For example, one feedback indicator may be an arrow pointing to the right that is displayed on the surface of a target indicating the need to aim the hand held device to the right of its currently aimed position. Optionally, such feedback information may also be provided on the display 17 located at an ergonomic position on top of the data collection device 11. Moreover, the feedback indicators may be optionally displayed only on the display 17, based on user preferences.

Additionally, the system 11 may also display information not related to scanning coded images, visually on a target surface. For example, the system 11 may display information related to the current status of the system or information related to the status of the battery in the system. Another example is the display of messages received over the RF transceiver.

A light source such as a laser device is employed by the system 11 to generate a laser beam 21 and scan coded images. The light source employs typical laser raster scanning techniques to scan coded images. For drawing the feedback indicators with a laser beam, system 11 traces the beam in a specific pattern to generate visual displays of specific feedback indicators. In tracing the laser beam along the beam patterns, system 11 employs only the required number of horizontal scans instead of scanning over the entire range of lines. This efficient mode of scanning while displaying a feedback indicator saves power consumption and extends battery life.

The generation of non-textual feedback indicators is facilitated by creating a standard set of beam patterns for a standard set of indicators. For each of the feedback indicators in such a standard set, the associated beam patterns are pre-calculated and stored in a memory in the system 11. When these feedback indicators are to be drawn, the necessary pre-calculated beam patterns are accessed from memory and employed to generate the visual display.

The type of feedback indicators displayed is determined by the operator preferences and the capability of the system 11. For example, the operator preferences may indicate textual feedback indicators and messages, in which case all feedback indicators and messages are displayed using text. If, on the other hand, the operator preferences indicates non-textual feedback indicators and textual messages, the system 11 would generate them as necessary.

Figure 1B:
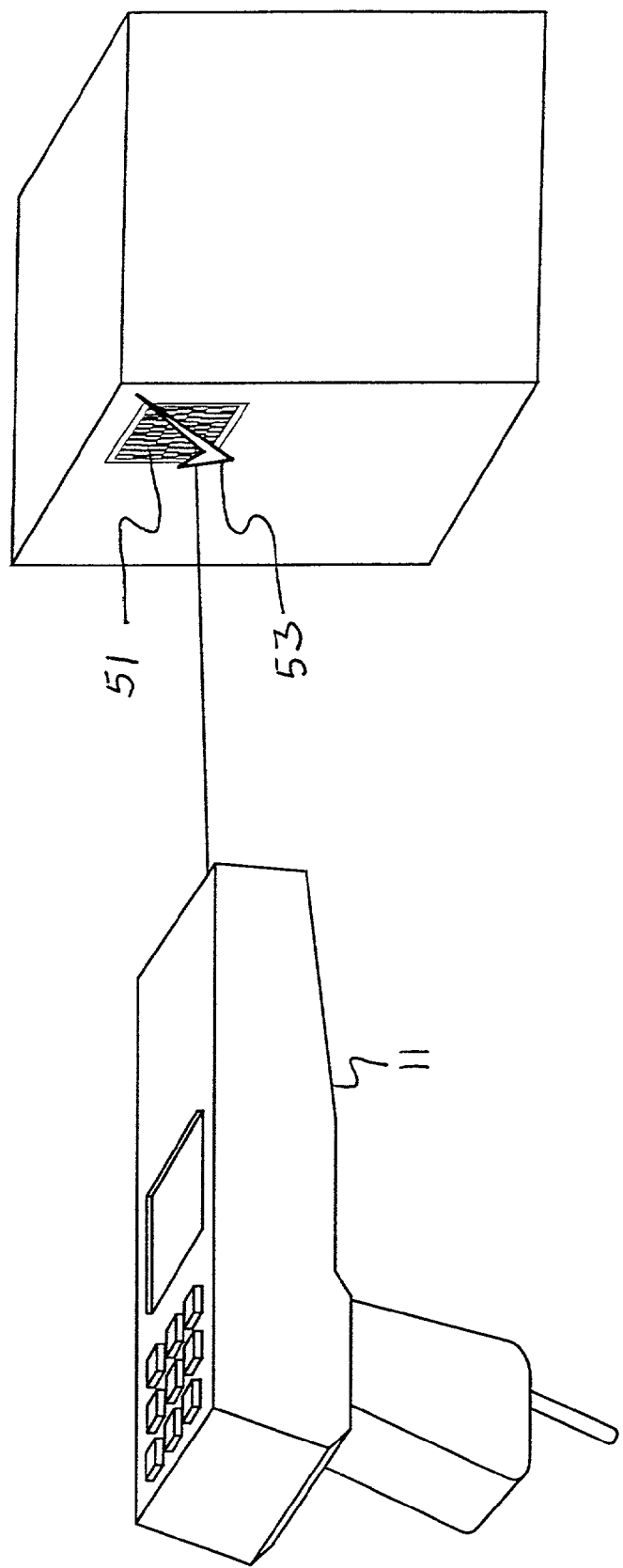
FIG. 1b is a perspective diagram of a hand-held portable data collection system of FIG. 1 showing a read completion feedback indicator.

FIG. 1b is a perspective diagram of the hand-held portable data collection system of FIG. 1 showing a read completion feedback indicator 53. The read completion feedback indicator 53 is optically generated and displayed while a two dimensional (2D) coded image 51 is being scanned by an operator. To successfully scan the coded image 51 and decipher the coded image, the operator needs to adjust the position of the data collection device 11. In this diagram a feedback indicator 53, displaying a visual check mark, indicates the successful completion of the scanning activity by the operator.

Figure 1C:
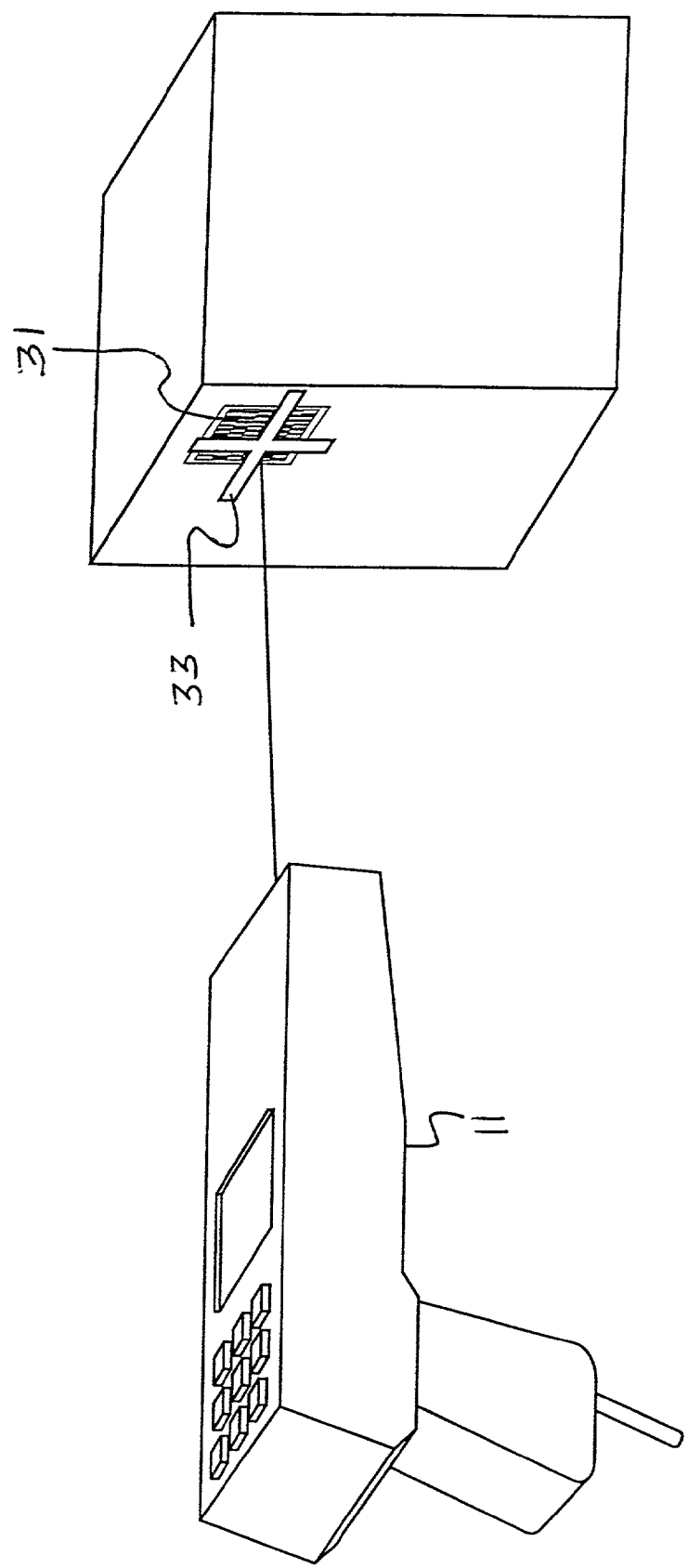
FIG. 1c is a perspective diagram of a hand-held portable data collection system of FIGS. 1a–b showing the display of a feedback indicator that directs the operator to move closer to the target image.

FIG. 1c is a perspective diagram of the hand-held portable data collection system of FIGS. 1a–b showing the display of a feedback indicator 33 that directs the operator to move closer to the target image 31. The feedback indicator 33 displayed is a "+" symbol to indicate the need to move the system 11 closer to the label 31.

During a scanning operation, an operator of the hand held data collection device 11 may position the system 11 too close to the label containing the coded image 31 or position it too far from the label 31. The operator may also aim the system 11 to the left of or to the right of the coded image 31 on the label on a target unit. An appropriate feedback indicator 33 is displayed to facilitate the adjustment of the position of the data collection device 11 by the operator.

The feedback indicators are generated by tracing an optical beam along scanning beam patterns employed by the system 11. Various beam patterns can be used to generate textual feedback indicators and textual messages, in addition to feedback indicators such as the "+" sign displayed.

Figure 1D:
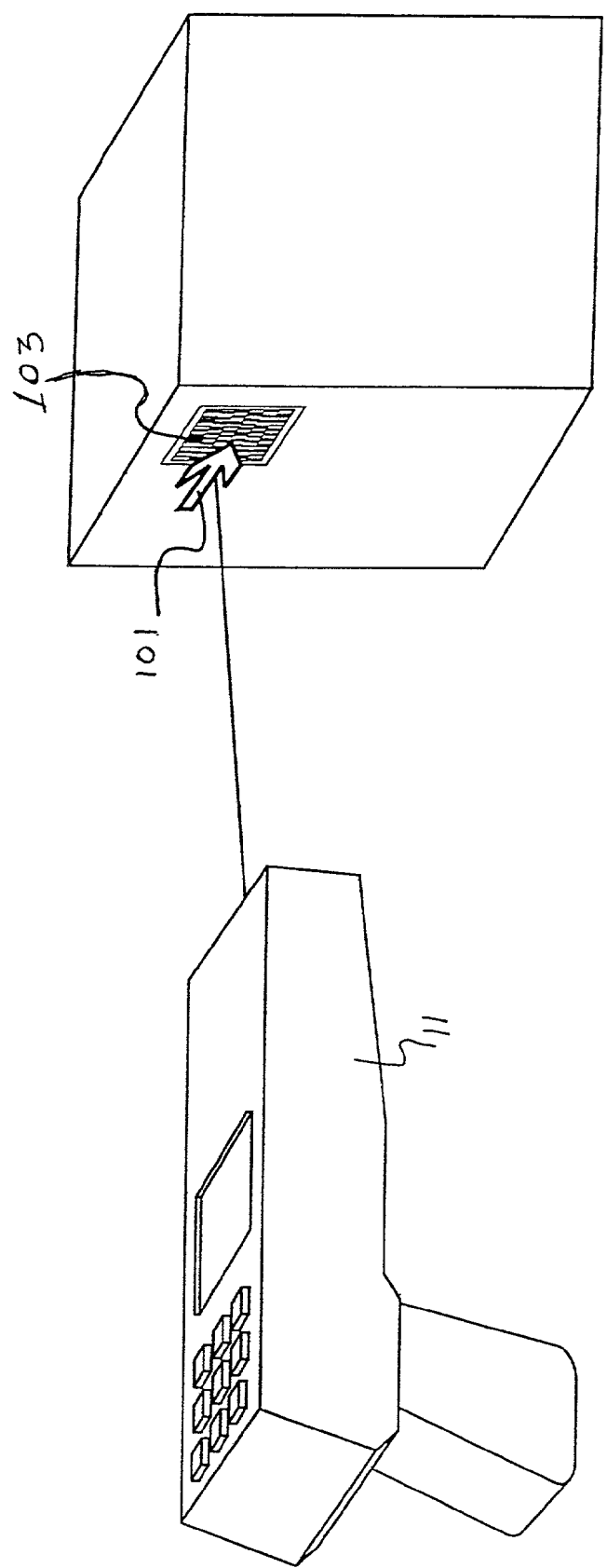
FIG. 1d is a perspective diagram of a data collection device indicating to an operator requisite adjustment information in graphical format for obtaining a successful reading of a coded image such as a bar code.

FIG. 1d is a perspective diagram of the data collection device indicating to an operator requisite adjustment information in graphical format for obtaining a successful reading of a coded image such as a bar code. Specifically, a hand-held portable data collection device 11, built in accordance with the present invention, scans a two dimensional (2D) coded image and displays a feedback indicator 101. The feedback indicator 101 recommends, to an operator, the need to position the system 11 to the right of its current position, for better aiming and effective scanning.

The activity of scanning a label containing a coded image, controlled by the system 11, typically illuminates only a small portion of the exposed area of a target unit such as a box that contains a coded image. The operator of the data collection device 11 may misalign the operational field of view with respect to a coded image 103 that is to be read, thus necessitating an adjustment in the position of the data collection device 11. The direction in which the data collection device 11 needs to be adjusted is detected by the data collection device 11 itself, based on collected data. The system 11 communicates the adjustment information to the operator by means of the feedback indicators 101 that are optically generated and displayed. A laser beam that is typically employed for scanning across a coded image 103, is also used to generate the feedback indicator 101. By the manipulation of the laser beam and making it trace a specific beam pattern, a feedback indicator 101 is generated and visually displayed. Optionally, two laser beam generators may be employed, one to scan coded images and the other to generate visual feedback indicators. The feedback indicator thus displayed will be visible to an operator without distracting the operator from his task of scanning coded images. Moreover, they can be used to convey information to the operator even when a display device such as a LCD screen is not available.

Figure 1E:
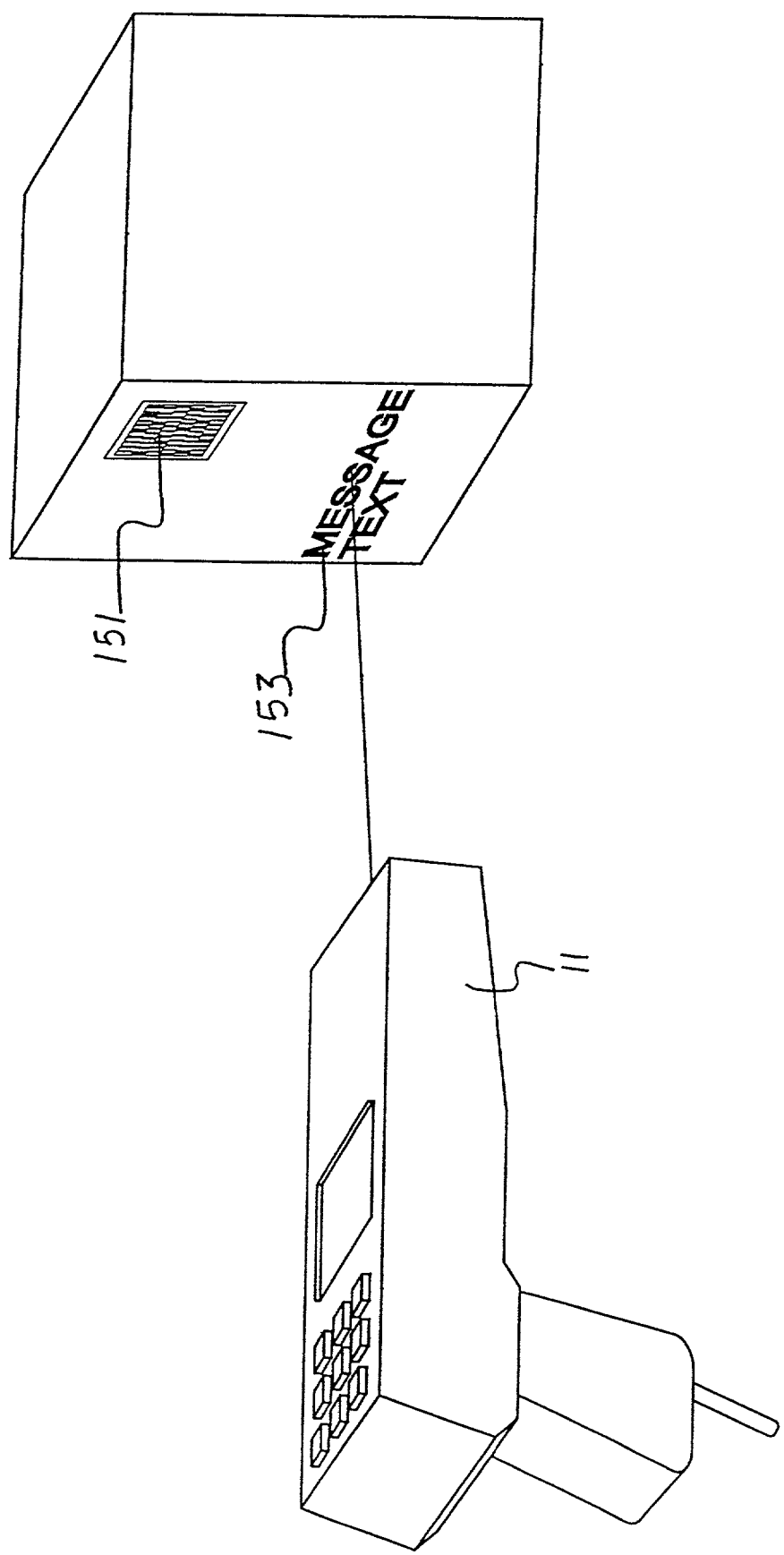
FIG. 1e is a perspective diagram of a hand-held portable data collection device in accordance with the present invention, showing an optical message being generated and displayed in textual form on a blank area of a box while an operator scans a coded image.

FIG. 1e is a perspective diagram of a hand-held portable data collection device 11, built in accordance with the present invention, showing an optical message 153 being generated and displayed in textual form on a blank area of a box while an operator scans a coded image 151. It indicates the ability of the data collection device 11 to display textual messages that the operator can clearly read, on a surface that is currently being scanned or about to be scanned. The textual message 153 that is displayed can be associated with information received by the hand-held data collection device 11 over an RF transceiver integrated into the device. Alternately, the textual message displayed may also be associated with internal information generated within the system 11 during the operation of the system.

Figure 2:
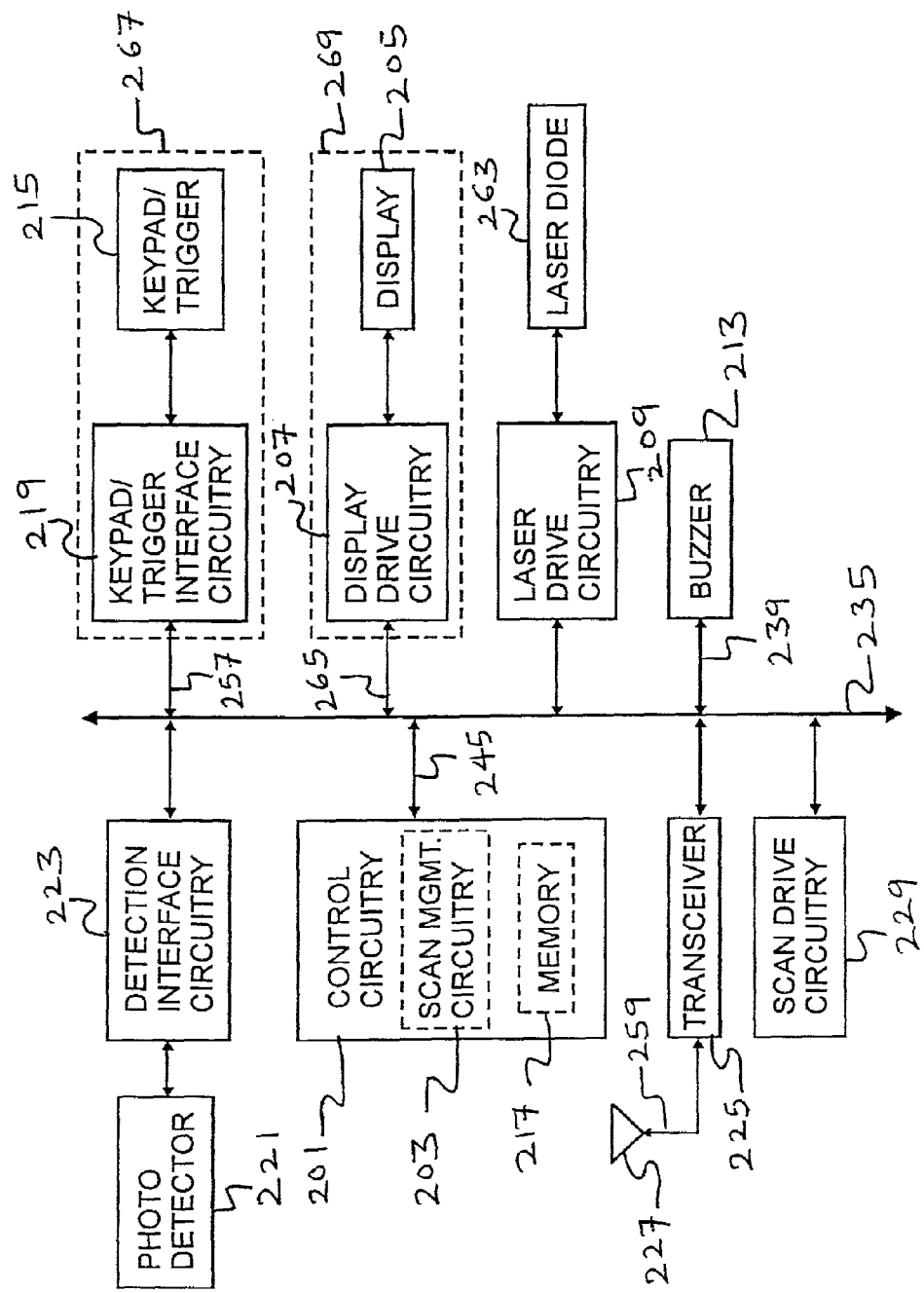
FIG. 2 is an exemplary schematic block diagram, of a hand-held portable data collection system, such as that of FIGS. 1a–e, that employs the same illumination mechanism to scan coded images and to display feedback indicators.

FIG. 2 is an exemplary schematic block diagram, of a hand-held portable data collection system, such as that of FIGS. 1a–e, that employs the same illumination mechanism to scan coded images and to display feedback indicators. A control circuitry 201 is responsible for coordinating the overall operation of the hand held system 11 of FIG. 1a. In this embodiment, the control circuitry 201 includes scan management circuitry 203 which coordinates the scanning activities. The scan management circuitry 203 scans a 2D coded image or a 1D coded image on a label by managing the operation of a scan drive circuitry 229, and a laser drive circuitry 209. The laser drive circuitry 209 operates laser diode 263, under the influence of the scan drive circuitry 229.

The scan management circuitry 203, or in its absence, the control circuitry 201, identifies the number of lines of scanning to be performed when displaying a feedback indicator or a message. To display a feedback indicator or a message, appropriate beam patterns are identified by the control circuitry 201 and the generation of the optical display is controlled by the scan management circuitry 203. The scan management circuitry 203 is responsible for operating the scanning activity so as to minimize the power consumed by the optical display generation activity. The power consumption is minimized by scanning only the required number of lines in the Y-axis during the generation of an optical display for a feedback indicator or message.

To initiate the scanning operation, the scan management circuitry 203 sends an enable signal to the scan drive circuitry 229 over a bus 235. The scan management circuitry 203 receives information on the current position of the Y-axis scan and the X-axis scan from the scan drive circuitry over the bus 235. It also sends a range select value to the scan drive circuitry 229, when scanning is to be performed to display a feedback indicator or message.

When the device of FIG. 2 is activated for scanning a coded image, the laser drive circuitry 209, under the control of the scan management circuitry 203, and with the scanning range information from the scan drive circuitry 229, causes the laser diode 263 to generate a laser beam and scan it across an operational field of view. In the preferred embodiment, the laser diode 263 is employed to generate a laser beam. Other laser generating devices may also be employed. The laser beam generated by the laser diode 263 may be controlled to scan or raster in both a vertical and a horizontal, orthogonal 2D scanning pattern. Thus, the pattern of the laser beam upon a surface, such as a surface containing a label with a coded image, may be controlled to create various visually readable patterns. In such an arrangement, visual indications may be communicated to the operator concerning the scanning process, as previously described in FIGS. 1a–1e.

The laser drive circuitry 209 and the laser diode 263 are collectively referred to as the illuminator circuitry, as they are used for the illumination of coded images. One advantage of the present invention over prior systems is the use of the illuminator circuitry for the illumination of coded images as well as for the generation and display of feedback indicators.

A photo detector 221 receives the laser signals after they are reflected from the coded images, when the coded images are scanned by a laser beam generated by the laser diode 263. The detection interface circuitry 223 processes the signals received by the photo detector 221 and analyzes them to detect the presence of a coded image. If a coded image is detected, the detection interface circuitry 223 sends appropriate signals to the control circuitry 201 over the bus 235. It also sends information on the position of the coded image within the operational field of view. After the laser diode 263, under the control of the scanning management circuitry 203, has scanned a coded image, the laser diode 263 is then deactivated while the detection interface circuitry 223 and the control circuitry 201 processes the information received from the photo detector 221.

If the scan of the coded image is unsuccessful and the coded image cannot be properly deciphered by detection interface circuitry and the control circuitry 201, the control circuitry 201 initiates the display of a feedback indicator to request the adjustment of the position of the system 11 by the operator. The control circuitry 201 interacts with a memory 217 where it stores pre-calculated beam pattern information for the standard set of feedback indicators. The beam pattern associated with a feedback indicator is accessed from memory 217 when the feedback indicator is to be displayed. After viewing the feedback indicator displayed, the operator may readjust the position of the hand held data collection device 11 in relation to the coded image such that the next attempt at reading the coded image would have a greater likelihood of success.

A keypad 215 can be employed by an operator of the hand held data collection device 11 of FIG. 1a to enter information into the system. Keypad/trigger interface circuitry 219, that is attached to the keypad/trigger by a link 253, is employed by the control circuitry 201 to control the entry of information from a keypad or trigger. The control circuitry 201 interacts with the keypad/trigger interface circuitry 219 over the bus 235.

A display 205 is used by the control circuitry 201 to display information that an operator can read. A display drive circuitry 207 provides an interface to the display 205. The control circuitry 201 communicates with the display drive circuitry 207 over the bus 235. The information displayed on the display 205 may also be simultaneously displayed visually on a target surface by the control circuitry 201 by generating and displaying a visual message or feedback indicator. The information may also be visually displayed as an icon or image, or communicated to the operator as an audio alarm via a buzzer 213.

The control circuitry 201 can be connected to other computers over a radio frequency (RF) link that can be established over a wireless transceiver 225. The wireless transceiver 225 receives information from external sources over the RF link using an antenna 227 and forwards them to the control circuitry over the bus 235. Messages and information received by the control circuitry 201 can be displayed using visual non-textual messages, textual, or a combination of non-textual and textual messages, so that the operator can view them.

The buzzer 213 can be used to alert the operator for various purposes. To provide vibrational and audio stimulus or feedback to an operator, the control circuitry 201 can activate the buzzer 213. An exemplary usage of the buzzer is the signal to alert the operator on operational problems with the laser diode 263.

Figure 3A:
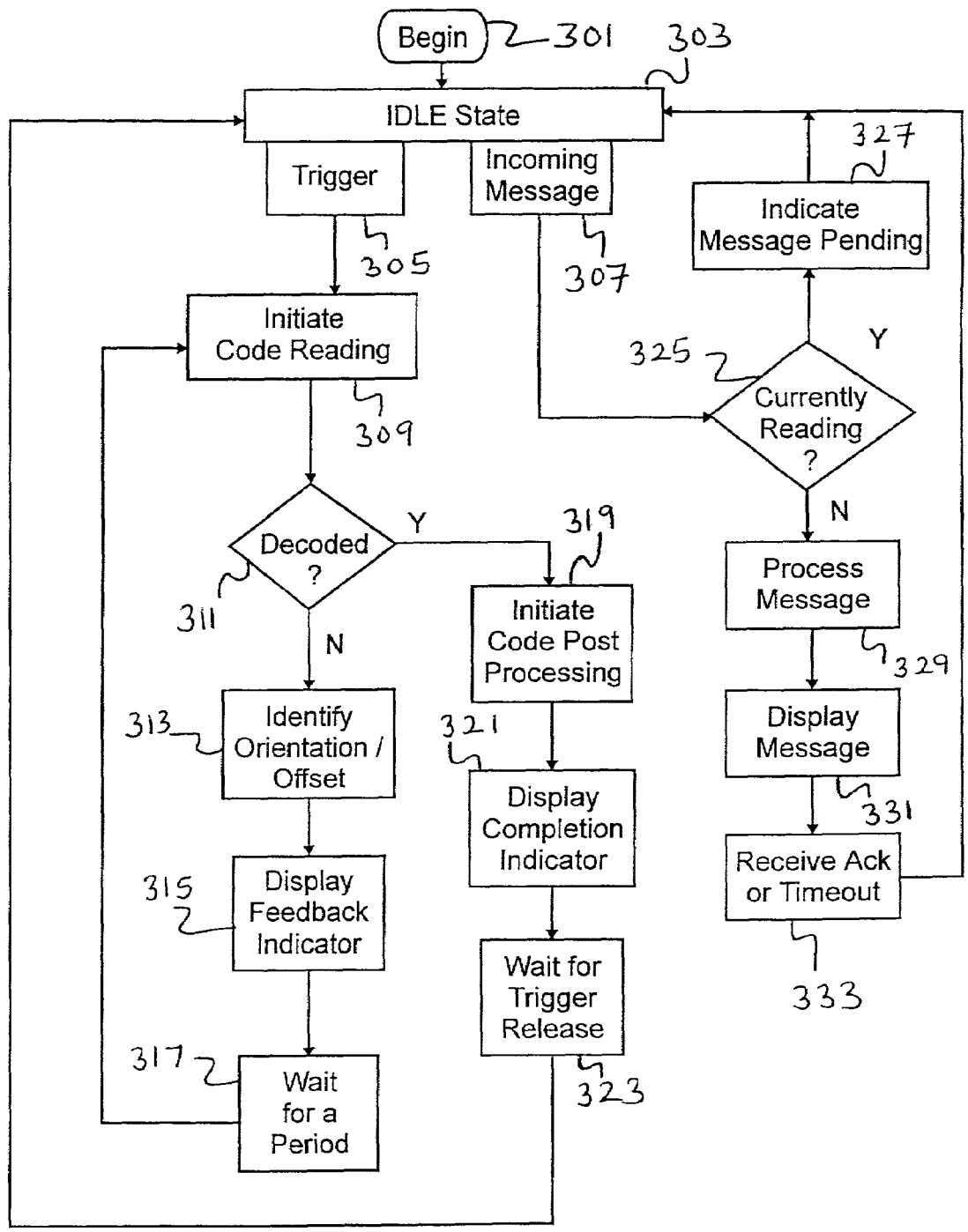
FIG. 3a is a flow chart illustrating an exemplary operation of a data collection system in accordance with the present invention, such as those illustrated in FIGS. 1a–2, where feedback indicators are displayed as necessary during the reading activity and messages are displayed when the reading activity is not being performed.

FIG. 3a is a flow chart illustrating an exemplary operation of a data collection system built in accordance with the present invention, such as those illustrated in FIGS. 1a–2, where feedback indicators are displayed as necessary during the reading activity and messages are displayed when the reading activity is not being performed. When the hand held system 11 is activated, the generation of visual patterns for feedback indicators is interspersed with the activity of reading for coded images. In one embodiment, while the activity of reading of coded images is being carried out, the feedback indicators are not displayed. Thus, these two activities are mutually exclusive. However, in another embodiment, the reading and display of feedback indicators is performed simultaneously, especially if the reading and the display of feedback indicators are executed by two different optical devices, for example by two different laser scanners.

A block 301 is the initialization point for the operation of the data collection system and the system rests at a block 303 when it is in an idle state. At block 303, the system also determines the need to display a message using the reading motion of the laser beam or the need to start reading a coded image. If a trigger is activated on the system, the trigger event 305 is received at the block 303. Later, if a coded image is to be read, the necessary activity of reading for coded images is initiated at a block 309. At a block 311, the system 11 determines if the coded image can be decoded. If the reading for the coded image is not successful due to the improper position or orientation of the hand held system with respect to the coded image, the laser beam is then employed to generate visual optical feedback indicators or messages and to display them. The orientation of the handheld system 11 of FIG. 1a and its offset from the coded image offset is identified at a block 313 and the necessary feedback indicator is identified at the block 313. The feedback indicator is then displayed at a block 315. The feedback indicator is optionally displayed on the LCD display screen. After the display of the feedback indicator, the system waits for a period, at a block 317, before returning to the block 309 where it attempts to initiate the reading of coded images again.

If, at the block 311, it is determined that the captured coded image can be decoded, then at the next block 319, the post processing of the coded image is initiated. Subsequently, at the next block 321, a display completion indicator is displayed visually using completion feedback indicators as previously described for FIG. 1b. Optionally, the associated feedback indicator is also displayed on the display 17. Later, at the next block 325, the data collection system waits for the release of the trigger by the operator before returning to the block 303.

When the system is at the block 303, it can receive an input 307 that indicates that incoming messages are to be delivered to the operator. At the block 303, if the system identifies the need to display a message, it determines if the system is currently reading a coded image at a block 325. If the system determines that a coded image is currently being read, it indicates a message pending signal to the operator at a block 327 and returns control to the block 303. The message pending signal can be created as an audio signal or as a vibration generated by a buzzer. Other kinds of signals may also be generated.

If, at the block 303, it is determined that a message is to be displayed, and at the block 325 it is determined that coded images are currently not being read, the message to be displayed is processed at a block 329. The message processing at the block 329 may involve formatting the message into a different format or translating the message into a different message. The processed message is then displayed onto the target surface at a block 331. Optionally, block 331 can also cause the same message to be displayed on the display device 17 located on top of the hand held system. After the display at the block 331, the system sets a timer to allow the operator to optionally acknowledge the receipt of the message displayed. At a block 333 the system 11 accepts any acknowledgment received from the operator, or the expiry of the timer period previously set, and then transfers control back to the idle state block 303.

Although, when the data collection system is being used to read a coded image, the message processing and display of messages is suspended until the reading of coded images is completed, in an alternate embodiment, the messages received during a reading activity may be queued up for subsequent access by an operator and the display of the messages may be deferred until further operator action. System generated messages, however, may be of a priority high enough to interrupt the reading activity, and may be displayed as soon as they are received.

Figure 3B:
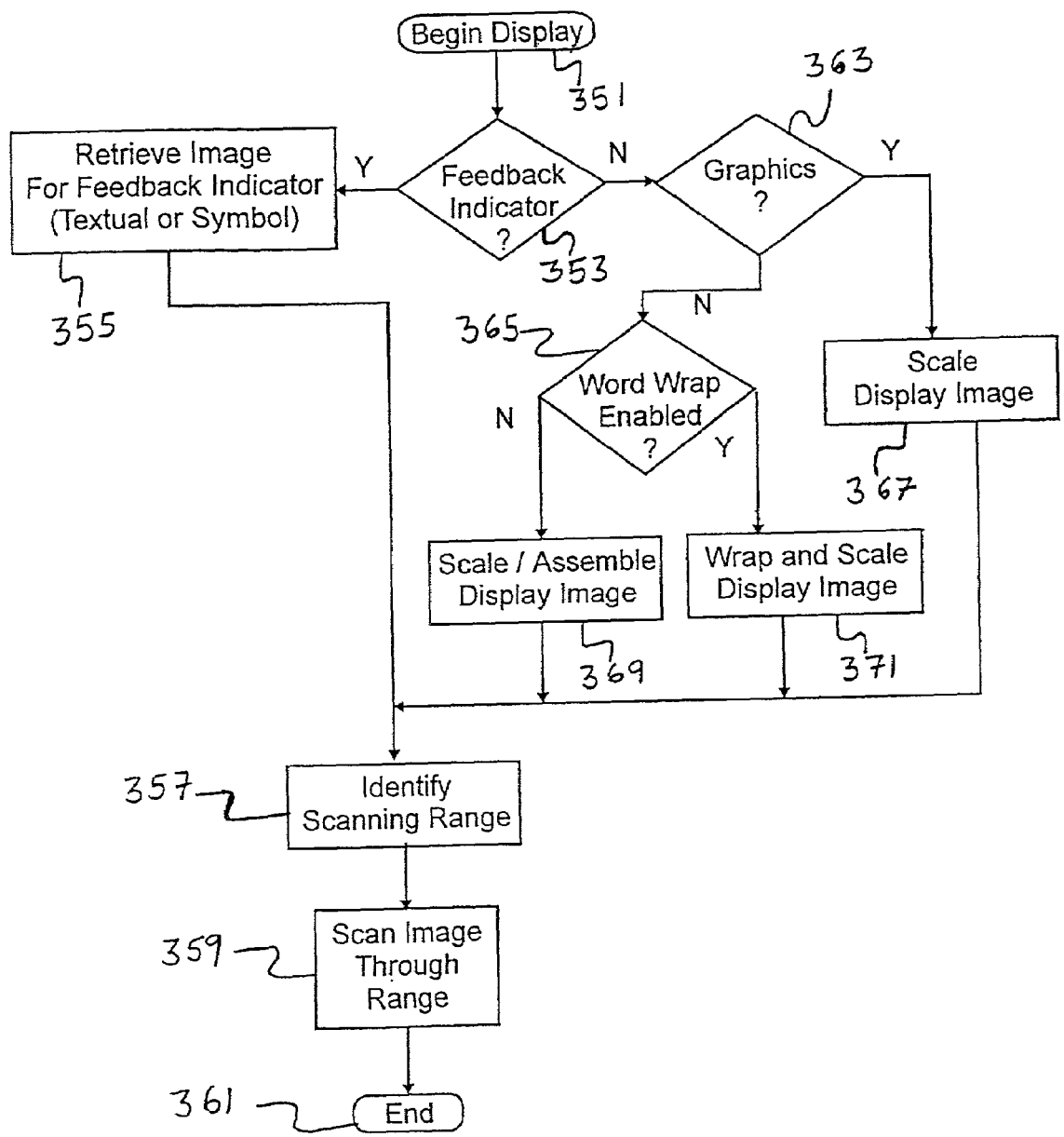
FIG. 3b is a flow chart describing an exemplary visual display operation utilizing optional scaling of text and graphics as well as optional word wrap of text.

FIG. 3b is a flow chart describing an exemplary visual display operation utilizing optional scaling of text and graphics as well as optional word wrap of text. The generation and display of a feedback indicator requires the identification of the feedback indicator and the manipulation of the laser beam to create a visual display for the feedback indicator. For a non-textual feedback indicator that belongs to a standard set, the beam pattern associated with the feedback indicator is selected from the set of pre-calculated beam patterns available in memory. The scan management circuitry identifies the number of lines of scanning necessary to display the feedback indicator using the beam pattern. The laser beam is then manipulated to display the feedback indicator on a target surface.

For textual messages or textual feedback indicators, pre-calculated beam patterns do not exist, and are calculated by the control circuit. The number of lines of scanning necessary to display the textual information is then calculated by the scan management circuitry. The actual display of textual messages using the laser beam is very similar to the technique employed to display non-textual feedback indicators.

At a block 351, the system begins the display operation. If, at a control block 353, it is determined that the feedback indicators are to be displayed, control is passed to a block 355 where an image associated with the required feedback indicator is retrieved from memory for display. The feedback indicator may be textual or non-textual. At a block 357, the range of x-axis scans and y-axis scans are determined, and at a block 359, the scanning of the laser beam is initiated to display the feedback indicator. After the display of the feedback indicators at the block 359, the display operation is terminated at a block 361.

If, at the control block 353, it is determined that a feedback indicator is not necessary, control is passed to a control block 363 where it is determined if a message with a graphic image is to be displayed. If a graphic image is to be displayed, the image is scaled to the required size at a block 367 and control is passed to the block 357 for subsequent scanning range calculation and display.

If, at the block 363, it is determined that a message with a graphic image need not be displayed, then control is passed to a block 365 for the display of textual information. Block 365 determines if word wrapping is enabled. If word wrapping is not enabled, block 365 passes control to a block 369 for the scaling and assembling of textual information before display. If word wrapping is enabled, block 365 passes control to a block 371 for word wrapping and scaling of the textual information to be displayed. In either case, the scanning range for the textual information is determined at the block 357 and scanning and display is initiated at the block 359 before terminating the operation at the block 361.

Figure 4A:
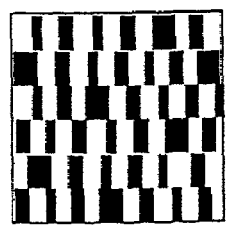
FIGS. 4a, 4c and 4e are exemplary scanned images received by three different scans, each corresponding to a different exemplary orientation of the hand-held scanning system with respect to a coded image being scanned, and FIGS. 4b, 4d and 4f, respectively, are exemplary feedback indicators that are generated in response.
Figure 4B:
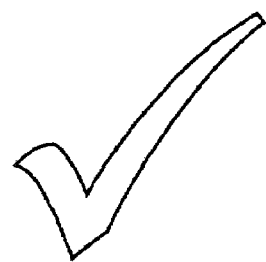
Figure 4C:
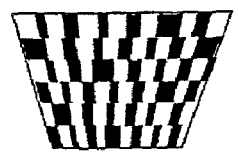
Figure 4D:
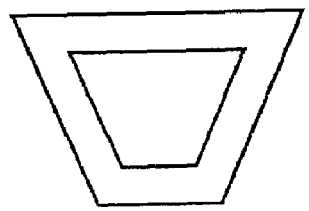
Figure 4E:
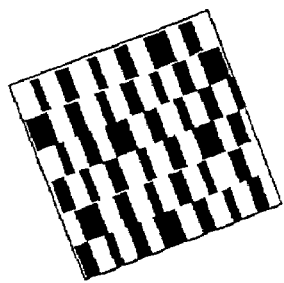
Figure 4F:
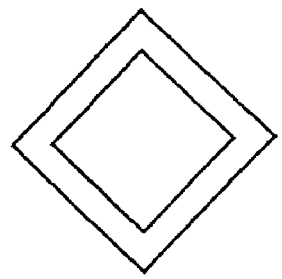

FIGS. 4a, 4c and 4e are exemplary scanned images received by three different scans, each corresponding to a different exemplary orientation of the hand-held scanning system 11 with respect to a coded image 25 being scanned, and FIGS. 4b, 4d and 4f, respectively, are exemplary feedback indicators that are generated in response. When a coded image is scanned in, as indicated by FIG. 4a, the system 11 decodes the image and reads it successfully. The system also generates the feedback indicator shown in FIG. 4b to indicate the successful completion of the scanning activity.

When a coded image is scanned in with an orientation as shown by FIG. 4c, the feedback indicator of FIG. 4d is generated and displayed by the system in order to highlight the problem with the orientation of the system with respect to the coded image. In response to this feedback indicator, the operator is expected to correct the orientation as indicated.

When a coded image is scanned in with a skewed orientation as indicated by FIG. 4e, the system generates and displays the feedback indicator of FIG. 4f in order to highlight the problem with the orientation of the system with respect to the coded image.

With hand held systems, such as the one shown in FIG. 4, when the hand held system is activated to scan one-dimensional bar codes, the generation of one dimensional visual patterns for feedback indicators is interspersed with the activity of scanning for the coded images. While the activity of scanning for coded images is being carried out, the feedback indicators may not displayed. Thus, these two activities are mutually exclusive. In an alternate embodiment, it is possible to display feedback indicators while simultaneously scanning coded images.

Figure 5:
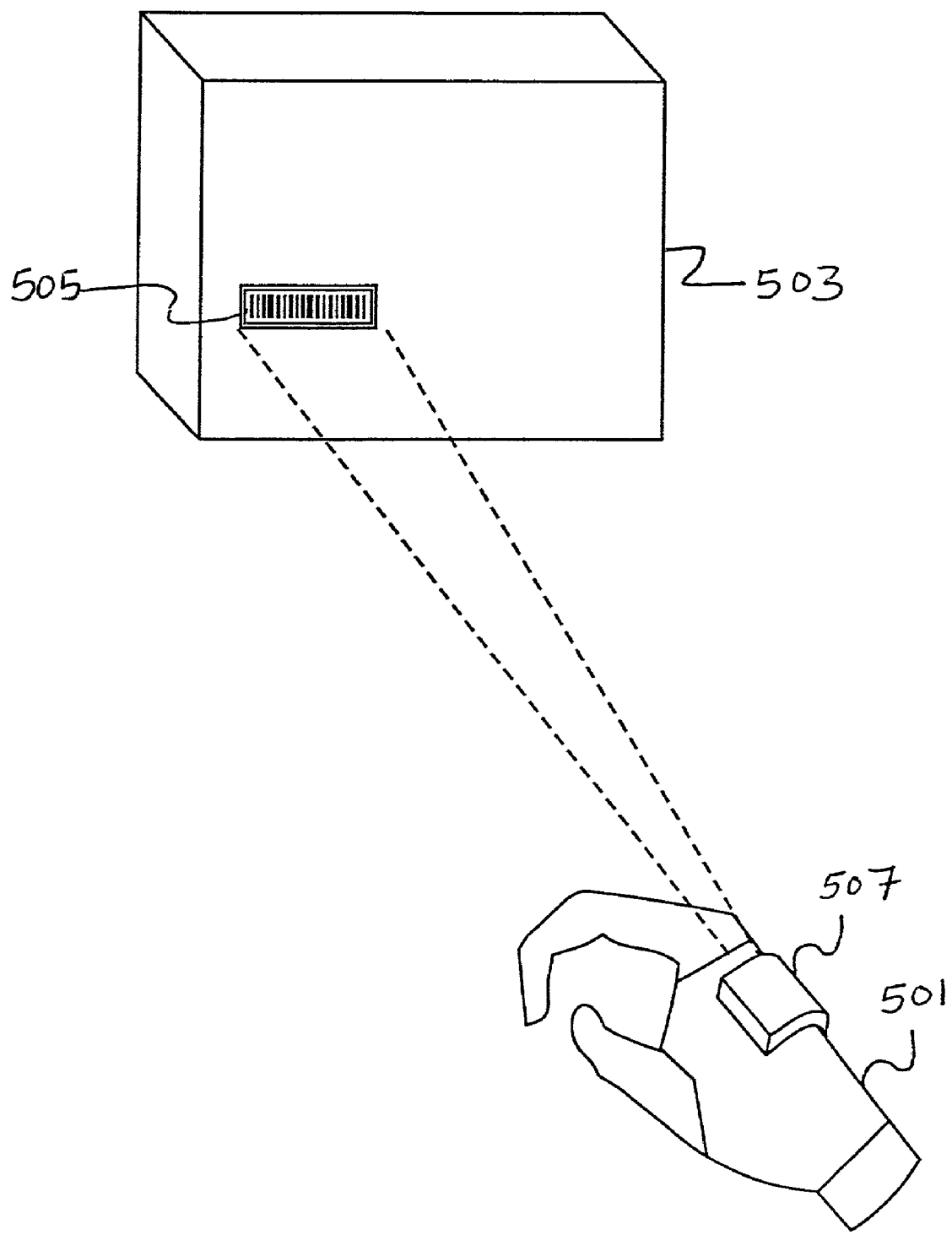
FIG. 5 is a perspective diagram of an exemplary glove shaped hand-held portable data collection device in accordance with the present invention that does not have room for a conventional LCD display at the top and relies on the generation of visual feedback indicators for communication with an operator.

FIG. 5 is a perspective diagram of an exemplary glove shaped hand-held portable data collection device, built in accordance with the present invention, that does not have room for a conventional LCD display at the top and relies on the generation of visual feedback indicators for communication with an operator. In this embodiment of the present invention, the hand-held data collection device 501 performs 1D laser scanning to read coded images, such as the coded image 505.

Even if there were room on the glove for a display unit, the addition of the display unit would add to the weight of the system and make it harder to use. Moreover, the operator wearing the glove would have difficulty aiming the glove at a target unit while simultaneously reading any displayed information on such a display unit. Thus, feedback indicators and other messages are instead displayed visually on the surface of a target unit 503.

When an operator tries to scan and read a coded image, such as the 1D bar code 505 located on the target unit 503, the glove shaped hand held data collection device 501 may not be properly aimed at the coded image. Again, the area scanned by the hand held device 501 may not completely cover the coded image 505, and feedback indicators are generated and displayed by the system 501 as necessary.

Figure 6A:
FIGS. 6a–6c depict exemplary feedback indicators and messages for a hand-held data collection system in accordance with the present invention when the data capture system is only capable of one dimensional scanning.
Figure 6B:
Figure 6C:
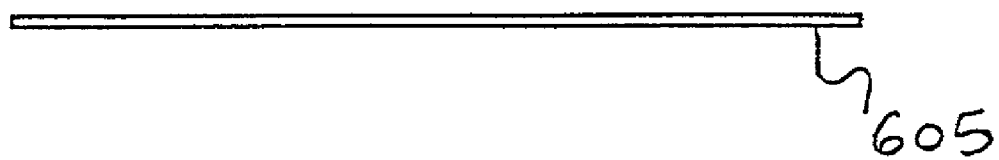

FIGS. 6a–6c depict exemplary feedback indicators and messages for the hand held data collection system of the present invention, when the data capture system is only capable of one dimensional scanning. In particular, FIG. 6a shows a visual display pattern generated by scanning the laser beam and controlling the light generated. This horizontal line 601 indicates that the coded image is too close to the hand-held system and that the operator should move the hand held system further away from the coded image for effective scanning.

FIG. 6b depicts an exemplary situation where the hand held data collection device is too far from the coded image and the operator should get closer to the coded image for effective scanning. A feedback indicator 603 is displayed to facilitate the adjustment of the position of the hand held data collection system, such as the data collection system 501, with respect to the coded image, such as the coded image 505, by the operator. The operator can adjust the position of the hand held system by moving closer to the coded image.

FIG. 6c depicts an exemplary situation where the completion indicator is displayed after a successful scanning of a 1D coded image by the hand held data collection system. A feedback indicator 605 is displayed as a completion indicator.

Figure 7A:
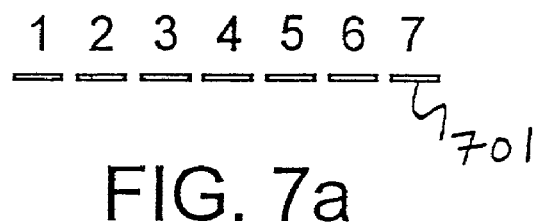
FIGS. 7a–7e are exemplary animated feedback indicators and messages for a hand-held data collection system in accordance with the present invention which is only capable of one dimensional scanning.

FIGS. 7a–7e are exemplary animated feedback indicators and messages for an hand held data collection system built in accordance with the present invention which is only capable of one dimensional scanning. Specifically, FIG. 7a shows an exemplary visual display pattern optically generated, in accordance with the present invention, by scanning a laser beam and controlling the light generated from the beam. A set of seven dashes 701, displayed in the order indicated (1 through 7) from left 1 to right 7, indicates that the hand held data collection system has been positioned to the left of the coded image and the operator should move the hand held data collection system to the right for effective scanning. This feedback indicator is visually displayed in the current operational field of view that extends from the position of the dash numbered 1 to the dash numbered 7 in the diagram, perhaps on top of the coded image, if the coded image happens to be in the field of view.

Figure 7B:
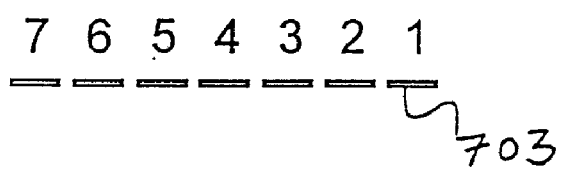

FIG. 7b shows another exemplary animated visual display pattern optically generated, in accordance with the present invention, by scanning a laser beam and controlling the light generated from the beam. A set of seven dashes 703 displayed in the order indicated from right to left indicates to an operator of a hand held data collection device, such as the one in FIG. 5, that the hand held system is positioned to the right of the coded image. The display of such a feedback indicator is a recommendation to the operator to adjust the position of the hand held device by moving it to the left of its current position.

Figure 7C:
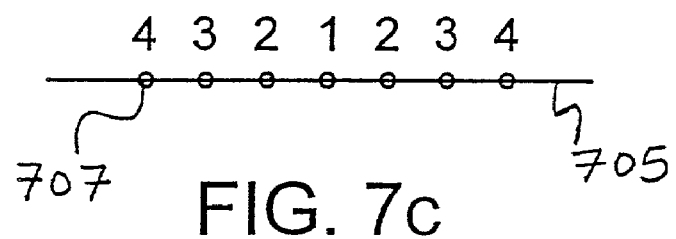

FIG. 7c shows an exemplary animated visual display pattern optically generated, in accordance with the present invention, where the generated display is an animated feedback indicator 705. Such an animated feedback indicator 705 is generated by scanning a laser beam and controlling the order in which the visual dots are generated from the beam. The dots that are visible are drawn in the order shown, from dot numbered 1 to dot numbered 4. When the dots are displayed in this order, an operator would perceive a moving dot, one that moves from the center to the ends, suggesting that the operator adjust the position of the hand held system by moving it further away from the coded image, for better coverage of a coded image and for better scanning. A similar animated feedback indicator is generated and displayed to recommend movement of the hand held system closer towards the coded image by the feedback indicator of FIG. 7d. To generate dots, the laser drive circuitry 209 of FIG. 2 manipulates the laser beam generated by the laser diode 263 in such a way so as to generate a fizzy light beam that looks like a dot on the surface of a target unit, such as a box with a bar code label.

Figure 7D:
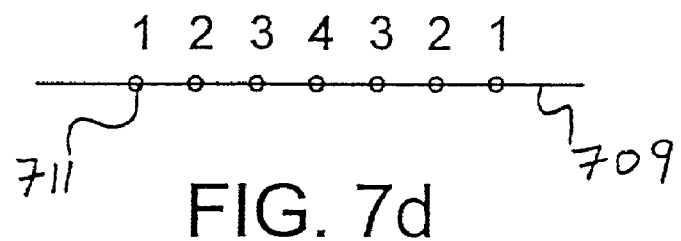

FIG. 7d shows another exemplary visual display feedback indicator generated in accordance with the present invention, where an animated feedback indicator is displayed to suggest that the operator move the hand held system closer towards the coded image for better scanning. The feedback indicator 709 is made up of a set of seven dots drawn in the order shown. The dots are drawn in the order of the numbers indicated in the diagram—from those numbered 1 to the one numbered 4. When the dots are displayed in this order onto a target surface, an animated feedback indicator is visually displayed that shows two dots from the extremes of the field of view moving towards the center. Such a display suggests to an operator that he should move the hand held system closer to the coded image being scanned.

Figure 7E:
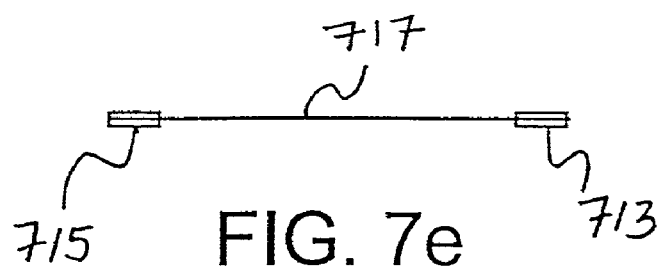

FIG. 7e shows another exemplary visual display feedback indicator generated in accordance with the present invention, where an animated feedback indicator is displayed, employing a line with two dashes 715, 713 that travel from its center to its ends. This feedback indicator can be employed to indicate the successful completion of the scanning activity.

Figure 8:
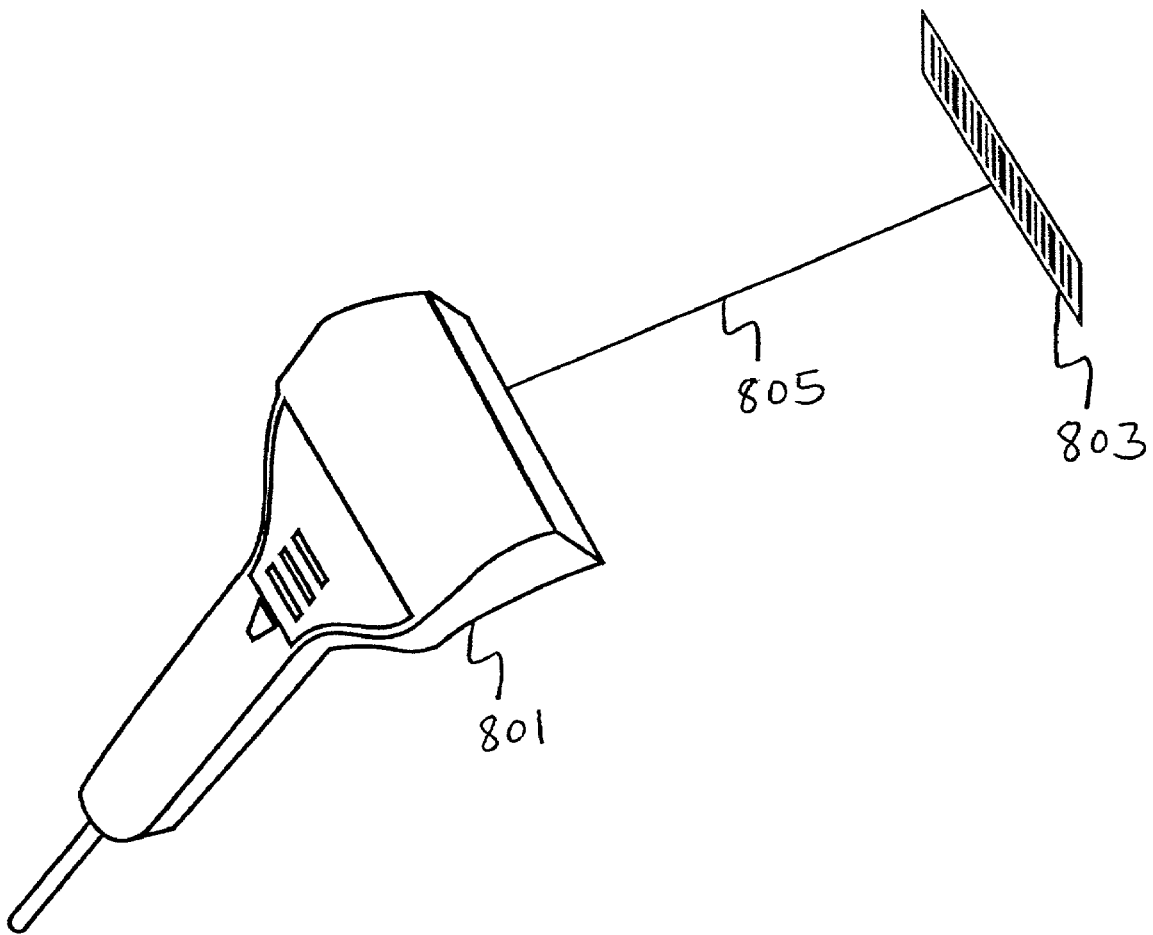
FIG. 8 is a diagrammatic representation of another embodiment of a hand-held portable data collection system that contains a plurality of LEDs for generating a scanning beam in accordance with the present invention, reading a one dimensional (1D) coded image.

FIG. 8 is a diagrammatic representation of another embodiment of a hand-held portable data collection system 801 that contains a plurality of LEDs for generating a scanning beam, built in accordance with the present invention, reading a one dimensional (1D) coded image. This system is a simpler embodiment and it does not contain a display device and its associated circuitry, such as the display 17 on top of the system 11 depicted in FIG. 1a.

The hand held data collection system 801 generates a beam 805 using the plurality of LEDs to scan a 1D coded image such as a bar code 803. The beam 805 is scanned across the 1D coded image 803 and the reflected signals are detected by a photo detector (not shown) within the hand held data collection system 801 and decoded by the hand-held data collection system 801.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

Appendix A is a copy of application Ser. No. 09/223,217 filed Dec. 30, 1998. Appendix A and said application are each hereby incorporated herein by reference in its entirety, as showing further embodiments within the scope of the present disclosure.

What is claimed is:

1. A data collection and communication apparatus, comprising:
   a housing having a size and shape capable of being hand held;
   an optical indicia reader, supported by said housing, capable of reading optical indicia located externally of said housing;
   a manual data input component, located on a user-accessible surface of said housing, capable of accepting data input by a user's hand;
   a wireless communication component, supported by said housing, capable of communicating data collected by the apparatus and capable of receiving data for use by the apparatus; and
   a visual image generator, located in said housing, wherein said visual image generator projects an image through air and onto a plane oriented upwardly and generally vertically such that a user can view a generated visual image without looking downwardly.

2. The data collection and communication apparatus according to claim 1, wherein said visual image generator comprises an illumination device capable of projecting an image as a head up display.

3. The data collection and communication apparatus according to claim 2, wherein said head up display is located on a vehicle windshield.

4. The data collection and communication apparatus according to claim 1, wherein said manual data input component comprises a keypad.

5. The data collection and communication apparatus according to claim 1, wherein said optical indicia reader comprises a laser scanner.

6. The data collection and communication apparatus according to claim 1, wherein said visual image generator generates an image onto a plane that is not parallel to a plane containing said manual data input component.

7. The data collection and communication apparatus according to claim 1, wherein said wireless communication component comprises a radio frequency communication component.

8. A portable data collection and communication apparatus, comprising:
- a housing having a size capable of being portable;
- an optical indicia reader, supported by said housing, capable of reading optical indicia located externally of said housing;
- a manual data input component, located on a user-accessible surface of said housing, capable of accepting data input by a user's hand;
- a wireless communication component, supported by said housing, capable of communicating data collected by the apparatus and capable of receiving data for use by the apparatus; and
- a visual image generator, located in said housing, wherein said visual image generator projects an image through air and onto a plane oriented generally vertically such that a user can view a generated visual image without looking downwardly.

9. The portable data collection and communication apparatus according to claim 8, wherein said housing has a size and shape permitting it to be hand held.

10. The portable data collection and communication apparatus according to claim 8, wherein said visual image generator comprises an illumination device capable of projecting an image as a head up display.

11. The portable data collection and communication apparatus according to claim 10, wherein said head up display is located on a vehicle windshield.

12. The portable data collection and communication apparatus according to claim 8, wherein said manual data input component comprises a keypad.

13. The portable data collection and communication apparatus according to claim 8, wherein said optical indicia reader comprises a laser scanner.

14. The portable data collection and communication apparatus according to claim 8, wherein said visual image generator generates an image onto a plane that is not parallel to a plane containing said manual data input component.

15. The portable data collection and communication apparatus according to claim 8, wherein said wireless communication component comprises a radio frequency communication component.

16. A portable data collection and communication apparatus, comprising:
- means for portably housing the apparatus;
- means for reading optical indicia, supported by said means for portably housing;
- means for manually inputting data, located on a user-accessible surface of said means for portably housing;
- means for wirelessly communicating, supported by said means for portably housing, capable of communicating data collected by the apparatus and capable of receiving data for use by the apparatus; and
- means for generating a visual image, located in said means for portably housing, wherein said means for generating a visual image projects an image through air and onto a plane oriented generally vertically such that a user can view a generated visual image without looking downwardly.

17. The portable data collection and communication apparatus according to claim 16, wherein said means for generating a visual image generates an image onto a plane that is not parallel to a plane containing said means for manually inputting data.

18. The portable data collection and communication apparatus according to claim 16, wherein said means for generating a visual image comprises an illumination device capable of projecting an image onto a generally vertical surface.

19. The portable data collection and communication apparatus according to claim 16, wherein said means for generating a visual image comprises an illumination device capable of projecting an image as a head up display.

20. The portable data collection and communication apparatus according to claim 19, wherein said head up display is located on a vehicle windshield.

* * * * *